US006202888B1

(12) United States Patent
Pollock et al.

(10) Patent No.: US 6,202,888 B1

(45) Date of Patent: Mar. 20, 2001

(54) SYSTEM AND METHOD FOR PERFORMING VEND OPERATION

(75) Inventors: Richard A. Pollock; Roy S. Steeley, both of Charles Town, WV (US); Kyriakos Spentzos, Santa Rosa, CA (US)

(73) Assignee: Automated Merchandising Systems, Inc., Kearneysville, WV (US)

( * ) Notice: Subject to any disclaimer, the term of this patent is extended or adjusted under 35 U.S.C. 154(b) by 0 days.

(21) Appl. No.: 09/340,048

(22) Filed: Jun. 28, 1999

(51) Int. Cl.$^7$ .................................................... B65G 59/00

(52) U.S. Cl. .................................................. 221/1; 221/75

(58) Field of Search ................................. 221/1, 75, 7, 9, 221/15, 88, 277, 195, 196, 289

(56) References Cited

U.S. PATENT DOCUMENTS

| | | | |
|---|---|---|---|
| 4,023,704 | 5/1977 | Pitel et al. . | |
| 4,045,626 | 8/1977 | Holper . | |
| 4,355,733 | 10/1982 | Schoenkopf et al. . | |
| 4,492,979 | 1/1985 | Linstromberg et al. . | |
| 4,560,088 | 12/1985 | Tan . | |
| 4,638,922 | 1/1987 | Stoltz . | |
| 4,942,979 * | 7/1990 | Linstromberg et al. | 221/75 |
| 5,303,844 | 4/1994 | Muehlberger . | |
| 5,553,736 | 9/1996 | Healis . | |
| 6,041,962 | 3/2000 | Pollock . | |

FOREIGN PATENT DOCUMENTS 3-81895 4/1991 (JP) .

* cited by examiner

*Primary Examiner*—Kenneth W. Noland
(74) *Attorney, Agent, or Firm*—Pillsbury Winthrop LLP

(57) ABSTRACT

A method and system are provided for performing vend operations on articles selected by a purchaser. Articles to be dispensed are stored in a storage section, and purchased articles are transferred from the storage section to a vend section. A vend mechanism is provided for rapidly moving a given article from a vend-destined section to the vend section. A helical transfer member holds the articles in the storage section and is rotatable in a dispensing direction to transfer the given article from a position adjacent the vend-destined section to the vend-destined section. The helical transfer member is also rotatable in a reverse direction opposite the dispensing direction. A driver is coupled to each helical transfer member, and is actuable to rotate the helical transfer member in either the dispensing direction or the reverse direction. A controller is operable during each vend operation to control the driver to first rotate the helical transfer member in the dispensing direction by a first amount until the given article is fully transferred to the vend-destined section. The controller then controls the driver to then rotate the helical transfer member in the reverse direction by a second amount until an article immediately following the given article is securely held in the storage section.

36 Claims, 10 Drawing Sheets

SYSTEM AND METHOD FOR PERFORMING VEND OPERATION

BACKGROUND OF THE INVENTION

1. Field of the Invention

The present invention relates to automated systems and methods for performing vend operations on articles selected by a purchaser. More specifically, the present invention relates to such a system or method which utilizes a helical transfer member holding plural articles in a storage section and rotatable to dispense an article.

2. Description of Background Information

Vending machines hold articles to be purchased within sections of a helical member. When the helical member is rotated, it forwards the article to the entrance of a chute which leads to a catch bin accessible through a vend opening. U.S. Pat. No. 5,303,844 to Muehlberger (the '844 patent) discloses one example of such a system. In that patent, the vending machine has a rear vertical chute which curves gradually under trays holding articles to be dispensed and communicates with a vend opening. The system utilizes a dispense sensor positioned at the exit side of each tray, and the dispense sensor detects when an individual article passes into the chute. A helix is continuously turned until the article is dispensed into the chute as sensed by the dispense sensor. Another sensor is provided to detect whether an article is present at the discharge end of the helix.

There are problems associated with existing or conventional vending systems. For example, the '844 patent system allows its helix to rotate until a vend is sensed by the passage of the article across a beveled surface provided at the exit end of the tray. While doing this, the helix may rotate so far that the next article is susceptible to slipping past and over the beveled surface into the chute. If the next article does not fall into the chute due to its own weight, it may be dislodged by the unscrupulous passerby by simply jarring or rocking the machine.

Some vending machines provide ejectors on the end of each helix, which comprise small plastic projections that force the product off the shelf slightly sooner than if the helix had no ejector. This allows the rotation in the dispensing direction to be stopped sooner, thereby allowing the helix to maintain a better grip on the next article, holding the next article and preventing it from slipping off the shelf. Some existing vending machines utilize helixes with such ejectors, and vend articles by rotating the helix one complete revolution (i.e., 360 degrees) per dispensed article. With this solution, however, it is necessary to provide separate ejectors on the ejecting end of each and every helix, which can increase material and assembly costs.

There is a need for a vending system which is simple in construction, yet ensures both the dispensing of an article when properly paid for, as well as the retention and storage of articles not yet paid for.

SUMMARY OF THE INVENTION

The present invention is provided to improve upon vending systems which automatically perform vend operations on articles selected by a purchaser. In order to achieve this end, one or more aspects of the present invention may be followed in order to bring about one or more specific objects and advantages such as those noted below.

One object of the present invention is to provide an automated method or system for performing vend operations on articles selected by a purchaser, whereby a mechanism is provided to ensure the dispensing of an article upon selection and payment for that article, while preventing a next article from being prematurely dispensed. A further object of the present invention is to provide such an automated vending method or system requiring less parts and a more simple construction.

The present invention, therefore, may be directed to a method or system, or one or more parts thereof, for performing vend operations on articles selected by a purchaser through a payment mechanism or point of sale (POS) device. In accordance with one aspect of the present invention, a vending system is provided which includes a storage section arranged to store articles to be dispensed. A vend section is provided to which a purchased article is transferred from the storage section. A vend-destined section and a vend mechanism associated with the vend-destined section are also provided. The vend mechanism rapidly moves a given article from the vend-destined section to the vend section. A helical transfer member holds the articles in the storage section, and is rotatable in a dispensing direction to transfer the given article from a position immediately adjacent the vend-destined section to the vend-destined section. The helical transfer member is also rotatable in a reverse direction opposite the dispensing direction.

A driver is coupled to the helical transfer member, and is actuable to rotate the helical transfer member in either the dispensing direction or the reverse direction. A controller is provided which is operable during each vend operation to control the driver to first rotate the helical transfer member in the dispensing direction by a first amount until the given article is fully transferred to the vend-destined section, and to then rotate the helical transfer member in the reverse direction by a second amount until an article immediately following the given article is securely held in the storage section.

The storage section may comprise a generally horizontal portion supporting the articles and an exiting end in communication with the vend-destined section. The vend section comprises an article catching bin and a vend opening providing outside access to the catching bin.

The vend mechanism may comprise a substantially vertical chute having an upper entrance and a lower exit leading to the vend section, wherein the vend-destined section is located at the upper entrance.

The helical transfer member may comprise a resilient rod formed as a helix. The driver may comprise an actuator and an electric motor. The controller may comprise a central processing unit (CPU).

The first and second amounts of rotation may be predetermined. For example, the first and second amounts of rotation may be fixed rotational amounts controlled by measuring an amount of time during which the driver rotates the helix, or controlled by sensing the amount of rotation of the helix. Alternatively, the amounts of rotation may be determined based upon the sensed condition of the articles. For example, the first amount of rotation may be 360+$a_1$ degrees of rotation, and the second amount of rotation may be $a_2$ degrees. The values $a_1$ and $a_2$ may be fixed, and equal to each other (e.g., by rotating the helix in either direction by an equal amount of time). In one implementation, $a_1$ is determined by rotating the helix for a given amount of time sufficient to assure that the given article is fully transferred to the vend-destined section. $a_2$ is the determined by simply rotating the helix in the opposite direction until a home position is sensed by a home position sensor or switch coupled to the motor.

The system may further comprise a positive vend sensor positioned to generate a positive vend signal indicating a positive vend whereby the given article is fully transferred to the vend-destined section. Alternatively, the positive vend sensor may be positioned to generate a positive vend signal indicating a positive vend whereby the given article is fully transferred to the vend section. For each vend operation, $a_1$ may be defined by the controller receiving the positive vend signal and stopping the dispensing rotation of the helical transfer member in response to the positive vend signal, and $a_2$ may be set by simply stopping the reverse rotation of the helical transfer member once the home position is sensed.

The system may further comprise a store check sensor positioned to generate a positive store signal indicating a secure storage state wherein the article immediately following the given article is securely held in the storage section. In this regard, for each vend operation, $a_2$ is defined by the controller receiving the positive store signal and stopping the reverse rotation of the helical transfer member in response to the positive store signal.

The storage section may comprise multiple storage subsections, and the system may comprise a corresponding helical transfer member and a corresponding driver for each of the storage subsections. Each corresponding helical transfer member holds additional articles in a corresponding one of the storage subsections, and is rotatable in a dispensing direction as well as in a reverse direction. Each corresponding driver is coupled to its corresponding helical transfer member, and is actuable to rotate its corresponding helical transfer member in either the dispensing direction or the reverse direction.

BRIEF DESCRIPTION OF THE DRAWINGS

The above and other objects, features, and advantages of the present invention are further described in the detailed description which follows, with reference to the drawings by way of non-limiting exemplary embodiments of the present invention, wherein like reference numerals represent similar parts of the present invention throughout the several views and wherein.

DETAILED DESCRIPTION OF THE EXEMPLARY EMBODIMENTS

Figure 1:
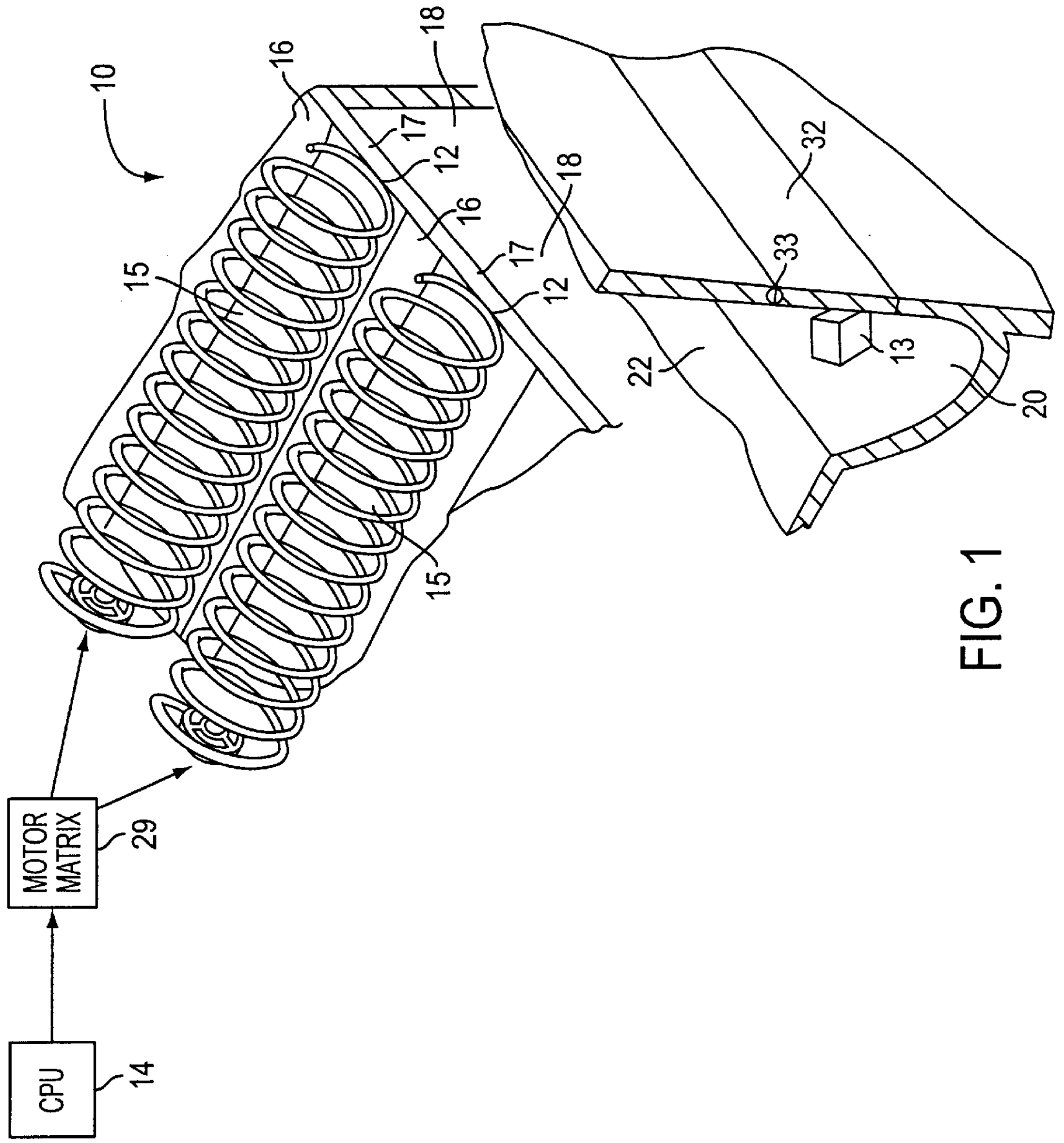
FIG. 1 shows parts of a vend system 10.

Referring now to the drawings in greater detail, FIG. 1 provides a simplified schematic/perspective view of a vend system 10. The illustrated vend system 10 comprises storage sections 16 arranged to store articles 13 to be dispensed (see FIG. 2). A vend section 20 (an article catch bin) is provided to which a purchased article 13 is transferred from its storage section 16. A vend-destined section 18 is located adjacent each storage section 16, and leads to a vend mechanism comprising a chute 22. Chute 22, in the illustrated embodiment, comprises a vertically-aligned space connecting the vend-destined section 18 to catch bin 20. Chute 22 is associated with each vend-destined section 18 to rapidly move a given article 13 from the vend-destined section 18 to catch bin 20. Alternatively, there may be no chute, in which case the placement of an article 13 in vend-destined section 18 would drop article 13 directly into catch bin 20 (otherwise referred to as a vend hopper).

As illustrated, each storage section 16 is supported by a generally horizontal portion 15 for supporting articles 13. A helical transfer member 12 is provided over each generally horizontal portion 15 within each storage section 16. Each storage section 16 further comprises an exiting end 17 in communication with a corresponding vend-destined section 18. Alternatively, the storage sections 16, and the corresponding portions 15 and helical transfer members 12, may be arranged vertically or sloped.

Each helical transfer member 12 holds articles 13 in a corresponding storage section 16, and is rotatable in a dispensing direction to transfer a given article 13 from a position immediately adjacent vend-destined section 18 to a position at which article 13 is in vend-destined section 18. Once the given article 13 is so transferred, it will immediately drop within chute 22 into article catch bin 20. Each helical transfer member 12 is also rotatable in a reverse direction opposite the dispensing direction. In the illustrated embodiment, the dispensing direction of each of the illustrated helical transfer members 12 is the clockwise direction, while the reverse direction is the counter-clockwise direction. Also, a single helical transfer member is used to store and dispense articles 13. Alternatively, a set of adjacent helical members may be provided which work in unison to store and dispense larger or wider articles. For example, it is well known to provide adjacent pairs of helical transfer members for larger articles, where the members within a given pair simultaneously rotate in opposite directions while dispensing an article.

A driver (a motor in the illustrated embodiment) is coupled to each corresponding helical transfer member 12. Vend system 10 comprises a motor matrix 29 controlled by a central processing unit (CPU) 14. Each motor is actuable to rotate its corresponding helical transfer member 12 in either of the dispensing direction or the reverse direction. Specifically, each corresponding motor first rotates helical transfer member 12 in the dispensing direction by a first amount until the given article 13 is fully transferred to vend-destined section 18, and then rotates helical transfer member 12 in the reverse direction by a second amount until the next article immediately following the given article 13 is securely held by its helical transfer member 12 in storage section 16.

The purchaser is given access to the dispensed article 13 within article catch bin 20, by means of a vend door 32, which in the illustrated embodiment comprises a horizontally-extending hinge 33 for facilitating the rotation of vend door 32 into vend section 20.

As noted above, vend mechanism 22 comprises a vertical chute, having an upper entrance at vend-destined section 18, and a lower exit at article catch bin 20.

Each helical transfer member 12 may be formed of any suitable material as known in the art, and preferably comprises a resilient rod formed as a helix.

Figure 2:
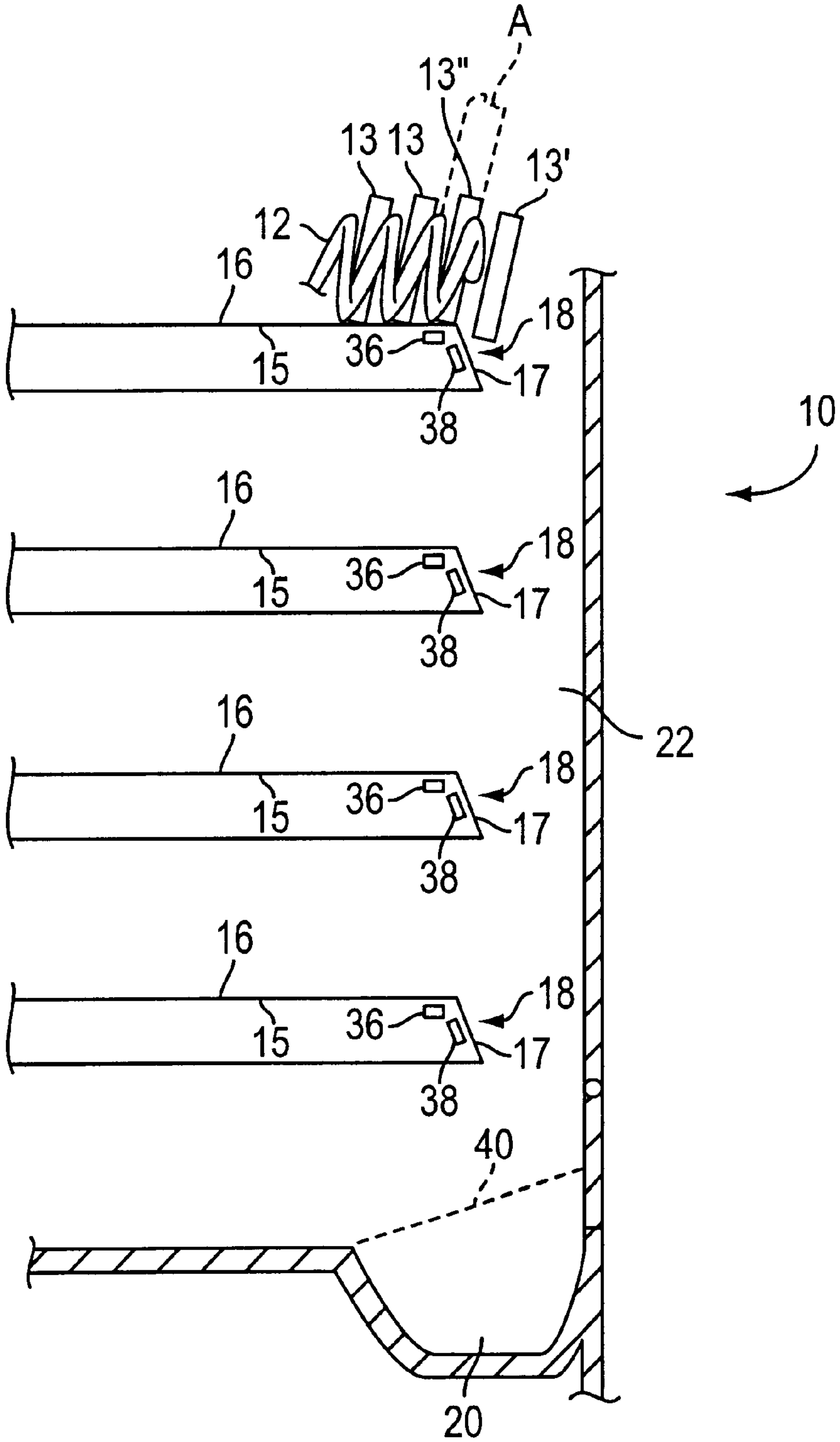
FIG. 2 is a cut-away side view of select portions of the illustrated vend system.

FIG. 2 provides a partial cutaway side view of vend system 10. As shown in FIG. 2, the vend system may be provided with multiple storage sections 16 and associated elements. Other corresponding elements, including helical transfer members 12, respective motors, and other elements, are provided for each of the storage sections 16, although many of these elements are absent from FIG. 2 for purposes of simplifying the present description.

As shown in FIG. 2, for each storage section 16, a helical transfer member 12 will hold a plurality of articles 13 in a securely stored position. Helical transfer member 12 is rotatable in the dispensing direction so as to allow a given article 13' to be transferred to vend-destined section 18, at which point it will be in the upper entrance of chute 20 and fall through the lower exit of chute 22 into article catch bin 20.

In operation, before a next article 13" is dispensed, it will be within a given region A as shown in FIG. 2, which means it will be in a securely stored position within that region, but ready for being dispensed by rotating helical transfer member 12 in the dispensing direction. Accordingly, CPU 14 will control the appropriate motor to first rotate helical transfer member 12 in the dispensing direction by a first amount until article 13" is fully transferred to vend-destined section 18 (as is article 13'). The first amount by which helical transfer member 12 is rotated in the dispensing direction may be an amount determined by CPU 14 controlling the corresponding motor to rotate helical transfer member 12 in the dispensing direction for a predetermined amount of time. Alternatively, if each motor is provided with a mechanism for providing an indication of its precise rotational position, CPU 14 can be provided with a signal indicating the rotational position of the motor, and may control the position of the motor so that the first amount by which the helical transfer member 12 is rotated is a fixed amount, for example, equal to $360+a_1$ degrees.

After helical transfer member 12 is rotated in the dispensing direction, it will then be controlled by CPU 14 to rotate in the reverse direction by a second amount. The second amount, $a_2$ degrees, may also be an amount controlled based upon sensing indications, or may be a fixed amount of rotation. Alternatively, the second amount of rotation may be controlled by simply timing the rotation of the helix. For example, if the motor rotates at a rate of 10 rpm or one revolution every six seconds, the motor may be reversed for one or two seconds once a positive vend has occurred. In the illustrated embodiment, a home position sensor 26 (see FIG. 6) is provided as part of each motor 30 corresponding to a helical transfer member 12. Every time motor 30 rotates 360 degrees, it will pass its home position. Home position sensor 26 provides an indication when the drive shaft of motor 30 is at the home position, and accordingly provides an indication as to when the corresponding helical transfer member 12 is at a corresponding home position. The second amount of rotation, $a_2$, may be determined by controller 14 controlling the corresponding motor to continue the rotation of helical transfer member 12 in the reverse direction until home position sensor 26 indicates helical transfer member 12 is in the home position. Both of values $a_1$ and $a_2$ may be fixed rotational amounts, and may be equal to each other.

It is important to maximize the number of articles that can be stored along the length of each helix, thus maximizing the use of space. The disclosed forward/reverse process allows the number of stored articles to be maximized. It does this by allowing the spatial interval between articles to be minimized, and by setting the sum of rotation of the helix in a given dispense cycle (total forward rotation less total reverse rotation) to a minimum (which is 360 degrees in the illustrated embodiment).

The illustrated vending system may comprise positive vend sensors 38 positioned at each exiting end 17 of each storage section 16, to generate a positive vend signal, which will be received by CPU 14, indicating a positive vend whereby given article 13' is fully transferred to vend-destined section 18. In addition, or alternatively, an optical sensing mechanism (not shown) may be provided to generate a positive vend signal indicating a positive vend whereby given article 13' is fully transferred to catch bin 20, by indicating when the given article 13' passes an optically sensed threshold 40.

Other sensors which may optionally be provided include store check sensors 36 positioned toward the exiting end at the upper surface of each horizontal section 15 of each storage section 16. Each store check sensor 36 generates a positive store signal, to be received by CPU 14, indicating a secure storage state wherein the article 13" immediately following the given article 13' is securely held in storage section 16.

The dispensing rotation of helical transfer member 12 may be stopped by CPU 14 once it receives a positive vend signal from either a positive vend sensor 38, or from an optical sensing mechanism (not shown) for optically sensing when articles pass optically sensed threshold 40.

Similarly, the reverse rotation of helical transfer member 12 may be stopped by CPU 14 once it receives a positive store signal from store check sensor 36.

Figure 3:
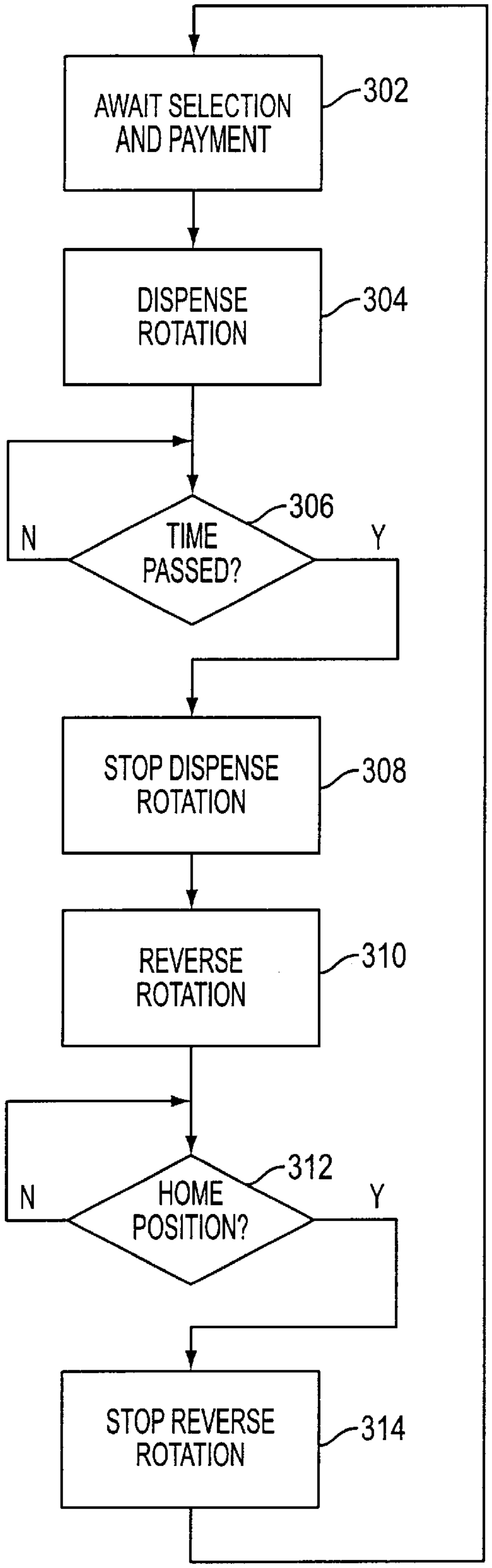
FIG. 3 is a flowchart of the CPU vend process in accordance with one embodiment.
Figure 4:
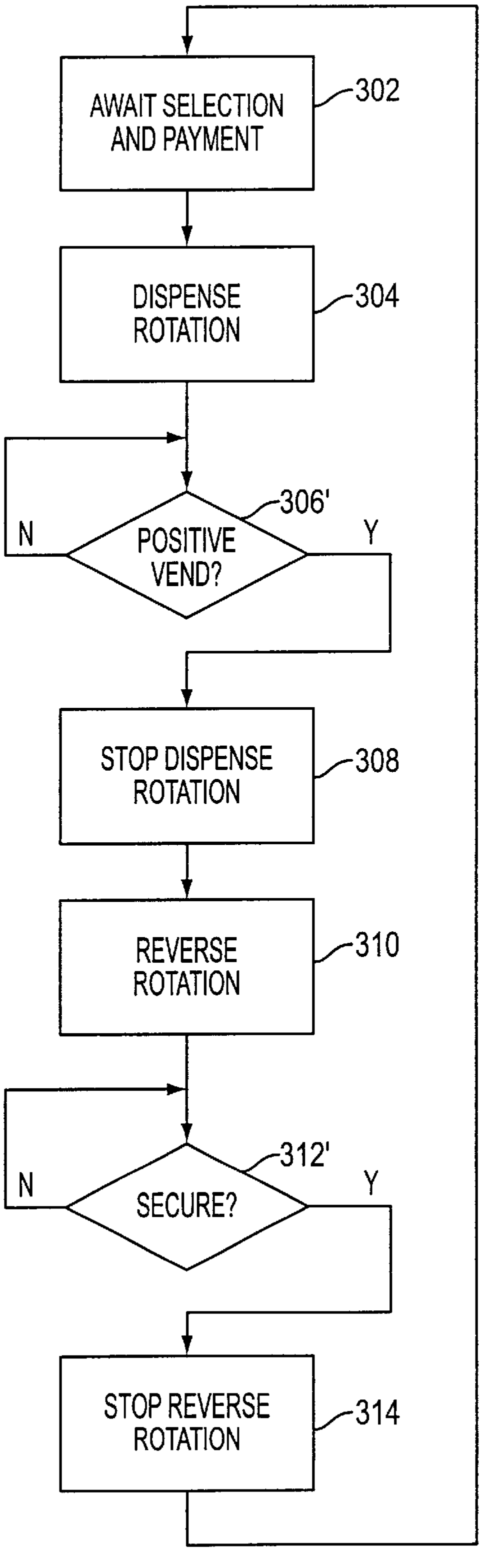
FIG. 4 is a flowchart of the CPU vend process in accordance with another embodiment.

FIGS. 3 and 4 are flowcharts of two variations of a process by which CPU 14 may control the dispensing of an article 13. In FIG. 3, the amount of rotation of helical transfer member 12 in the dispense direction and in the reverse direction are defined based upon a predetermined amount of time of dispense rotation and a continued reverse rotation until helical transfer member 12 reaches its home position. In FIG. 3, the amount of rotation in the dispense direction and in the reverse direction are defined based upon sensing signals.

Referring now to FIG. 3, as an initial act 302, CPU 14 will wait for a customer to select a particular article and to pay for the selected article. The article may be selected, and paid for, using standard selection and payment mechanisms. For example, a keypad (not shown) and a money receiving mechanism (not shown) may each be provided. In addition, a point of sale (POS) mechanism (not shown) may be provided which allows the customer to swipe a credit card or a debit card to effect payment.

Then, in act 304, CPU 14 will commence the rotation of the helical transfer member 12 corresponding to the selected article. In act 306, a determination is made as to whether helical transfer member 12 has rotated the desired amount, by timing the rotation. That is helical transfer member 12 is simply rotated in the dispensing direction until a predetermined amount of time has passed. If the requisite time has not passed, the dispensing rotation of helical transfer member 12 is continued. If helical transfer member 12 has been rotated the desired amount of $360+a_1$ degrees based upon a time measurement, the process will proceed to act 308, at which point the dispense rotation will be stopped. At act 310, helical transfer member 12 will be rotated in the reverse direction, until a determination is made at act 312 that it has been rotated by an amount equal to $a_2$ degrees, which will occur once helical transfer member 12 reaches its home position as sensed by a home position sensor provided as part of the corresponding motor. At this point, the rotation will be stopped at step 314. The process will then return to act 302, and await the selection and payment for another article.

FIG. 4 is identical to FIG. 3, except for the provision of modified decision blocks 306' and 312'. At decision block 306', a determination is made as to whether a positive vend has occurred. A positive vend may occur, as described above, when the appropriate sensor indicates such occurrence. That sensor may be a sensor provided at the exit of the storage section, or it may be a sensor provided near article catch bin 20.

At decision block 312', a determination is made as to whether the article 13" immediately following the given article 13' is held in storage section 16 in a secure state. This may be determined, by way of example, by the use of a store check sensor 36, as shown in FIG. 2.

Figure 5:
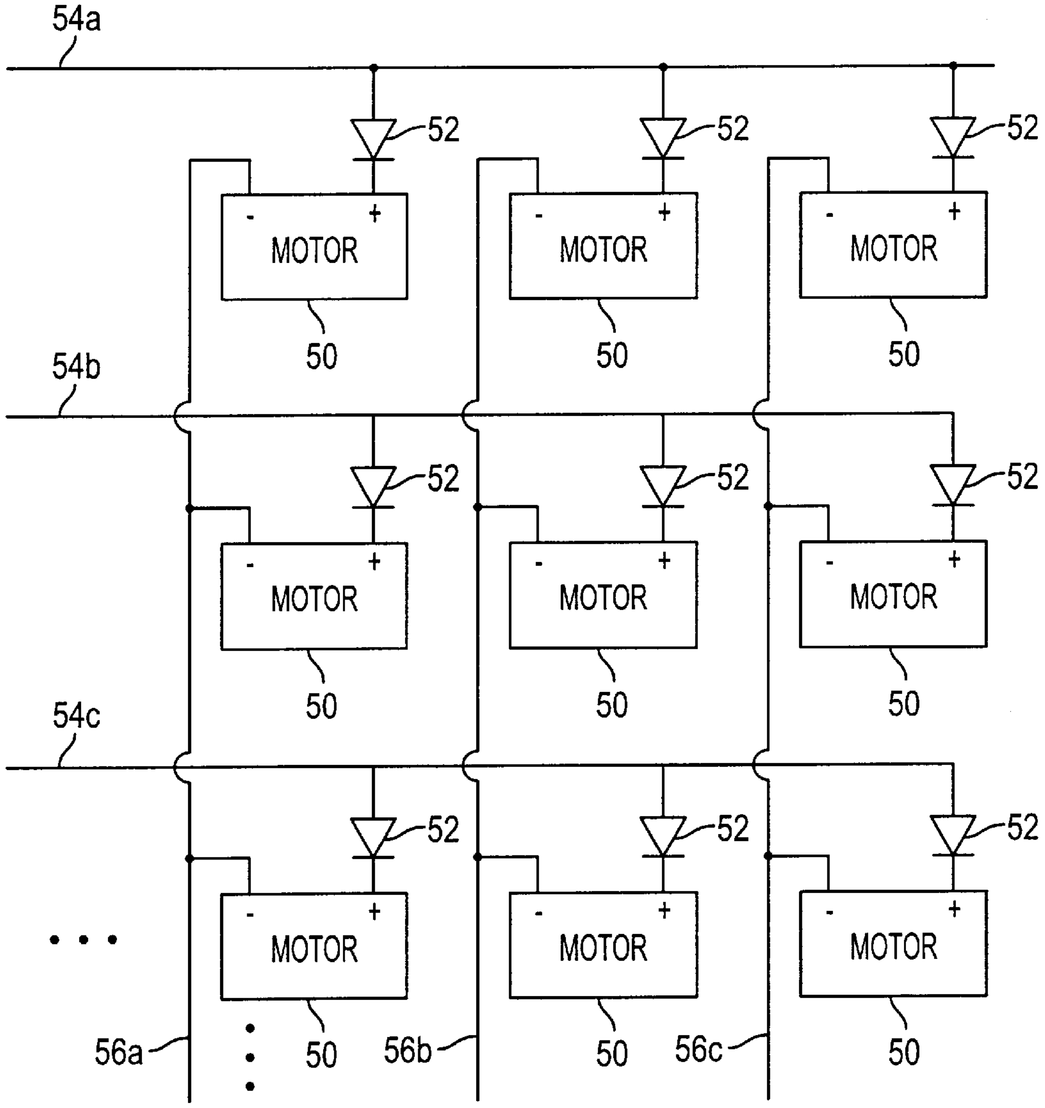
FIG. 5 (PRIOR ART)
FIG. 5 is a schematic diagram of a conventional motor matrix used to control the operation of a matrix of helixes in a conventional vending system.

FIG. 5 illustrates a conventional motor matrix comprising a plurality of motors 50 each of which corresponds to a respective helix of the vending system. The motors 50 are arranged in columns and rows. A row drive line 54*a*, 54*b*, 54*c* is provided at each row, and a column drive line 56*a*–56*c* is provided at each column. The motor matrix illustrated in FIG. 5 helps reduce the amount of wiring needed to separately control each of the motors 50. A given motor 50 can be addressed by applying driver voltages to a set of row and column drive lines 54, 56. For example, the center motor 50 shown in FIG. 5 may be actuated by applying a positive voltage level to row drive line 54*b* and concurrently applying a lower voltage level to column drive line 56*b*. Diodes 52 are provided between each of the row drive lines 54*a*–54*c* and each of the respective positive terminals of motors 50. Diodes 52 prevent stray currents which may be formed while a given motor 50 is addressed from affecting other motors 50, not intended to be actuated at that time.

The motor matrix shown in FIG. 5 is not suitable for a vend system such as that of the present invention which allows for the reverse rotation of helical transfer members 12. While a given motor 50 can be actuated to rotate in the dispensing direction, by applying a positive voltage to a given row drive line 54 along with a lower voltage level to a given column drive line 56, reversing of those voltage levels will not have the desired effect.

Figure 6:
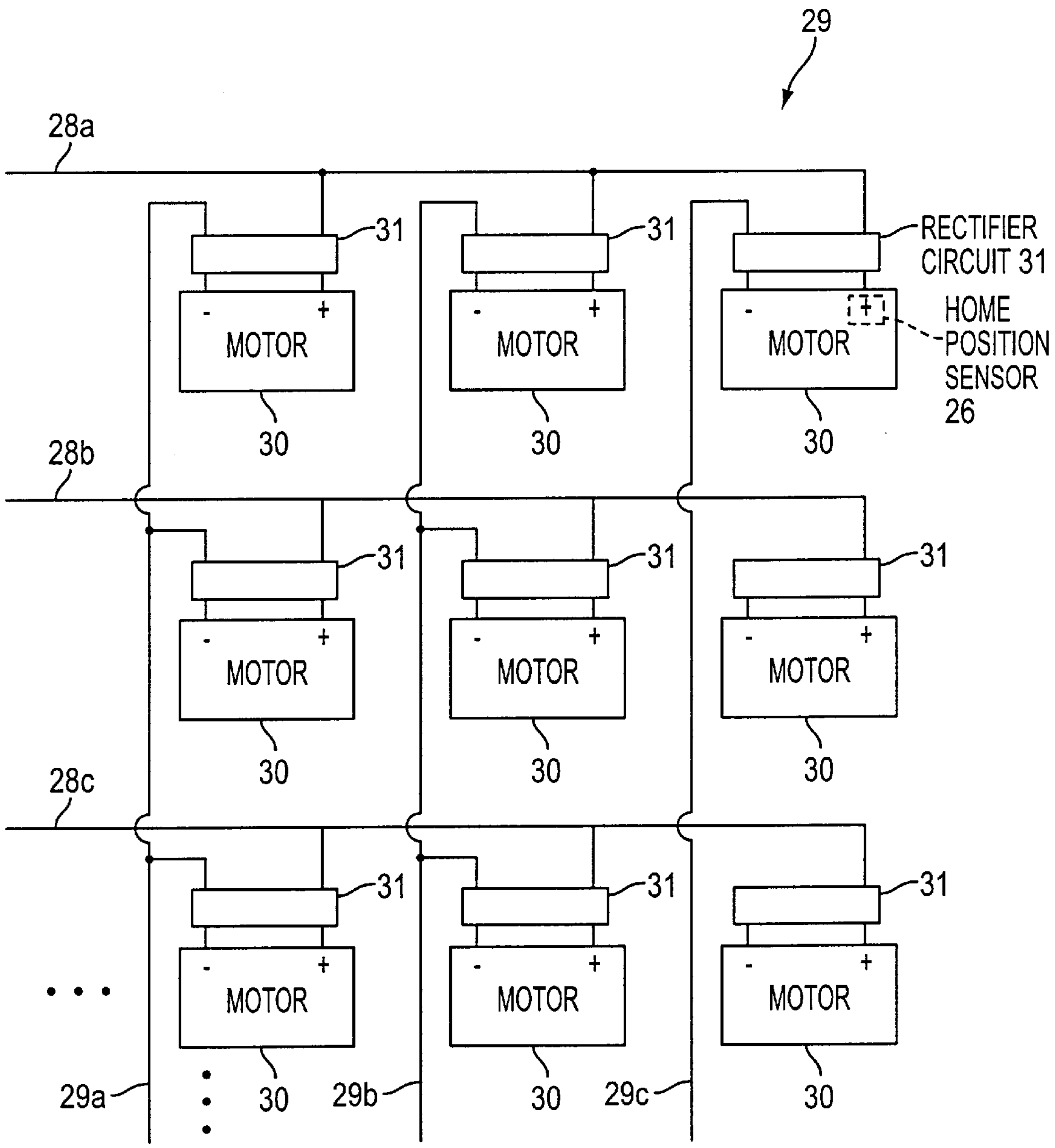
FIG. 6 is a schematic diagram of a motor matrix in accordance with the illustrated embodiment.

FIG. 6 shows a motor matrix 29 in accordance with a particular embodiment of the present invention. As shown in FIG. 6, a matrix of motors 30 is provided, comprising a motor 30 corresponding to each helical transfer member 12 of vending system 10. A plurality of row drive lines 28*a*–28*c* are provided for addressing respective rows of motors 30, and a plurality of column drive lines 29*a*–29*c* are provided for addressing respective columns of motors 30. When the proper voltage levels are applied to a given row-column pair 28, 29, the corresponding motor 30 is actuated either in the dispensing direction or in the reverse direction.

Each motor 30 is provided with a corresponding steering circuit 31, which eliminates the problems associated with stray currents that might occur due to the reversing of polarities of the voltages applied to the given row-column pairs of row and column drive lines 28 and 29.

Figure 7A:
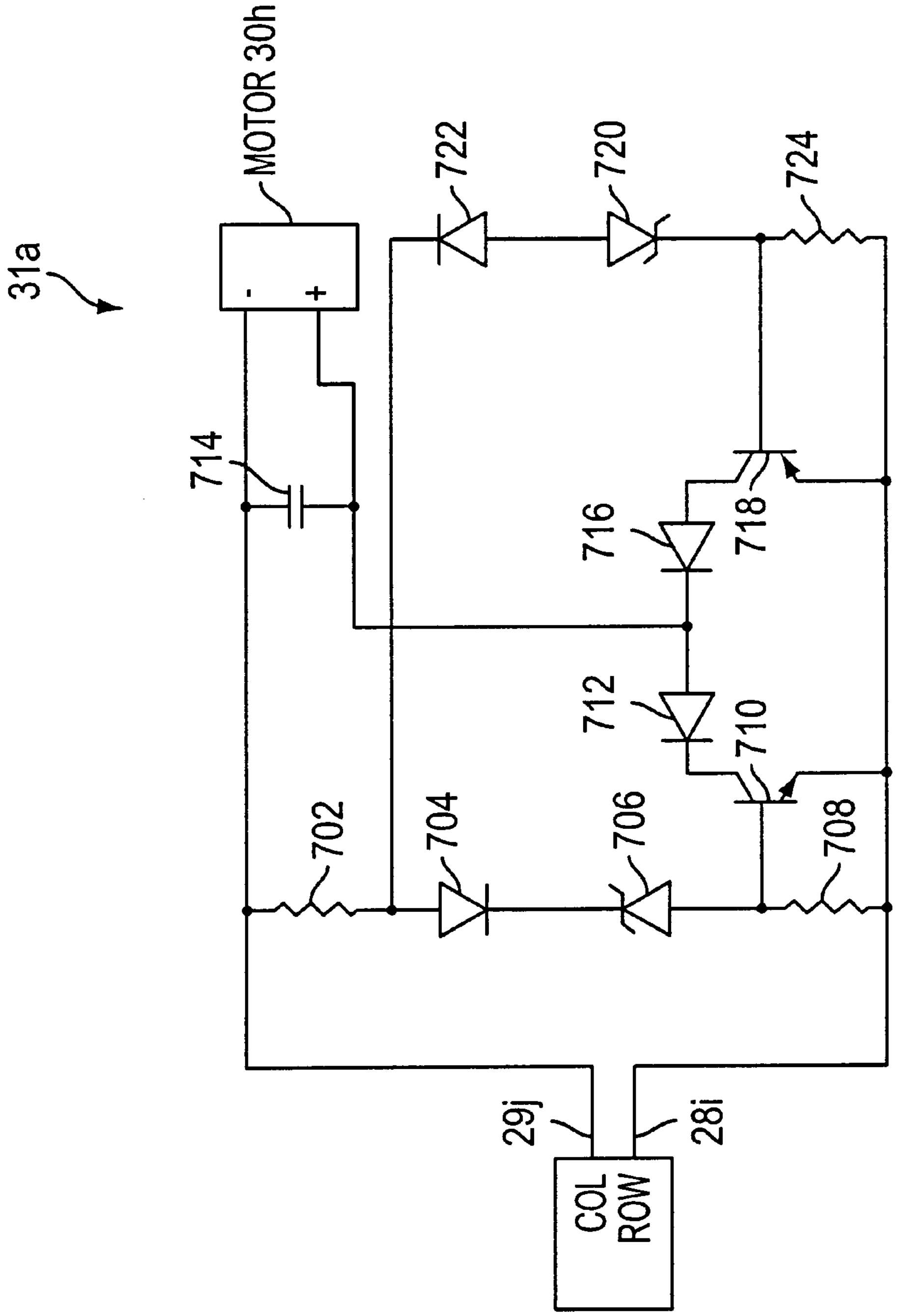
FIGS. 7A–7C are respective schematic diagrams of several different embodiments of a steering mechanism.

FIG. 7A illustrates a specific embodiment of a steering circuit 31 a connecting a given motor 30*h* to a pair of row and column drive lines 28*i*, 29*j*. In the illustrated embodiment, each steering circuit 31 a may be identical, and accordingly, is coupled between a pair of row-column drive lines 28, 29 and a given motor 30 in the same way for each motor within motor matrix 29.

A first resistor 702 is connected at one end to the negative terminal of motor 30*h* and column drive line 29*j*, and at its other end to the anode of a first diode 704 (a blocking diode). The cathode of first diode 704 is connected to the cathode of a first zener diode 706. The anode of first zener diode 706 is connected to a second resistor 708, the other end of which is connected to row drive line 28*i*. A capacitor 714 is connected across the negative and positive terminals of motor 30*h*, in order to mitigate the effects of brush noise. Second resistor 708 is connected across the base and emitter of a first (npn) transistor 710. The collector of first transistor 710 is connected to the cathode of a second diode 712, the anode of which is connected to the positive terminal of motor 30*h*. The anode of second diode 712 is also connected to the cathode of a third diode 716, the anode of which is connected to the collector of a second (pnp) transistor 718. The emitter of second transistor 718 is connected to the emitter of first transistor 710, which is connected to one end of second resistor 708. A third resistor 724 is connected across the emitter and the base of second transistor 718. A second zener diode 720 is connected at its cathode to the base of second transistor 718, and at its anode to the anode of a fourth diode 722 (which serves as a blocking diode), the cathode of which is connected to the junction of first resistor 702 and first diode 704.

In operation, in order to rotate motor 30*h* in a first direction (which may correspond either to a dispense or reverse direction of helical transfer member 12, depending upon the particular configuration), a positive voltage value in the amount of 24 volts is applied to column drive line 29*j*, while row drive line 28*i* is grounded. This causes current to flow into and downward through first resistor 702, continuing on through first diode (blocking diode) 704 and through first zener diode 706, completing the current path through second resistor 708. Zener diode 706 has a threshold voltage of 16 volts. Accordingly, the +24 volts applied to column drive line 29*j* is sufficient to overcome the threshold voltage of zener diode 706. The current flowing through second resistor 708 causes a positive voltage to be applied to the base of first transistor 710, which causes first transistor 710 to switch on. This causes current to flow from the positive terminal of motor 30*h* through second diode 712, and out of the emitter of transistor 710, returning to ground at row drive line 28*i*.

The positive current enters motor 30*h* at its negative terminal. Fourth diode 722 serves as a blocking diode, preventing current from also flowing down the path starting with fourth diode 722 and continuing with second zener diode 720. Accordingly, a voltage will not be formed across third resistor 724, and the second transistor 718 will not be turned on. Third diode 716 also serves as a blocking diode, and prevents current leaving the positive terminal of motor 30*h* from entering the collector of second transistor 718. The characteristics of fourth diode 722 are the same as the characteristics of first diode 704. Similarly, the characteristics of second zener diode 720 are identical to the characteristics of first zener diode 706. Diodes 712 and 716 also similarly have the same characteristics.

First and second zener diodes 706, 720 each have threshold voltages of approximately 16 volts. Accordingly, connected pairs of zener diodes from corresponding pairs of adjacent steering circuits form a combined threshold of 32 volts, and thereby prevent stray currents intended for other motors from flowing through motor 30*h*.

When the voltages across column and row drive lines 29*j* and 28*i* are reversed, and a positive 24 volts is applied to row drive line 28*i*, while column drive line 29*j* is grounded, the current will flow from row drive line 28*i* up through third resistor 724, second zener diode 720, and fourth diode 722. This causes a voltage to be formed across third resistor 724, which will turn on second transistor 718. This results in current also flowing through second transistor 718 and then through third diode 716, entering the positive terminal of motor 30*h*, and exiting the negative terminal of motor 30*h*. The current returns to the column drive line 29*j* which is at ground. The current is blocked by second diode 712 and thus prevented from entering the base of first transistor 710. The current is also blocked by first diode 704 and thus prevented from flowing down through the circuit formed by first diode 704, first zener diode 706, and second resistor 708.

CPU 14 applies control signals which will cause the appropriate voltage values to be applied to the column and row drive lines, as appropriate to control the actuation of the motors either in the dispensing direction or in the reverse direction.

Figure 7B:
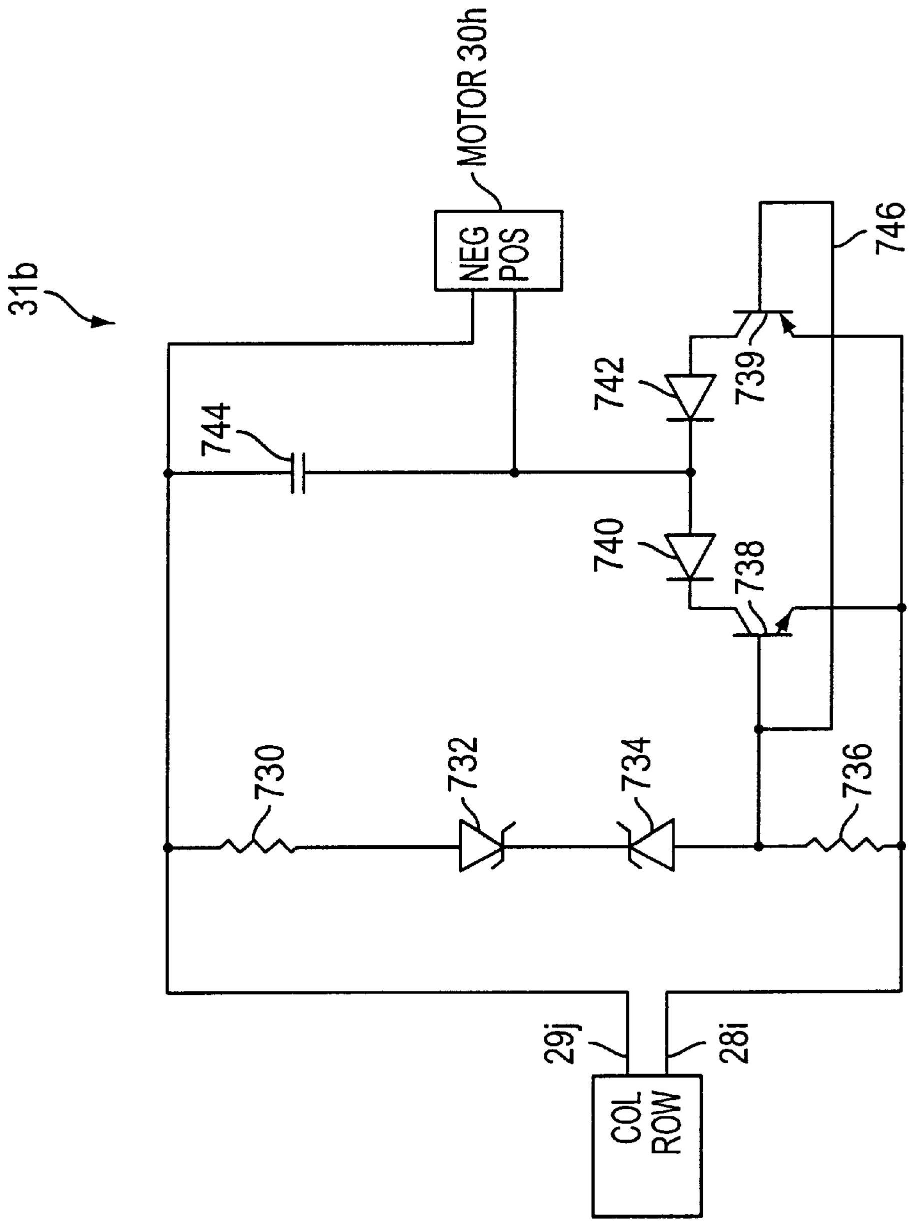

FIG. 7B illustrates another embodiment steering circuit 31*b* connecting a given motor 30*h* to a pair of row and column drive lines 281, 29*j*. In the illustrated embodiment, each steering circuit 31*b* is identical, and accordingly, is coupled between a pair of row-column drive lines 28, 29 and a given motor 30 in the same way for each motor within motor matrix 29.

A first resistor 730 is connected at one end to the negative terminal of motor 30*h* and column drive line 29*j*, and at its other end to the anode of a first zener diode 732. The cathode of first zener diode 732 is connected to the cathode of a second zener diode 734. The anode of second zener diode 734 is connected to a second resistor 736, the other end of which is connected to row drive line 28*i*. A capacitor 744 is connected across the negative and positive terminals of motor 30*h*. Second resistor 736 is connected across the base and emitter of a first (npn) transistor 738. The collector of first transistor 736 is connected to the cathode of a first diode 740, the anode of which is connected to the positive terminal of motor 30*h*. The anode of first diode 740 is also connected to the cathode of a second diode 742, the anode of which is connected to the collector of a second (pnp) transistor 739. The emitter of second transistor 739 is connected to the emitter of first transistor 738, which is connected to one end of second resistor 736. The bases of each of first and second transistors 738 and 739 are connected to each other via a base coupling connection 746.

The embodiment of FIG. 7B modifies that of FIG. 7A by combining the two voltage sensing legs (one comprising elements 704 and 706, and the other comprising elements 722 and 720) into one (comprising elements 732 and 734). By using less elements, costs are reduced.

Figure 7C:
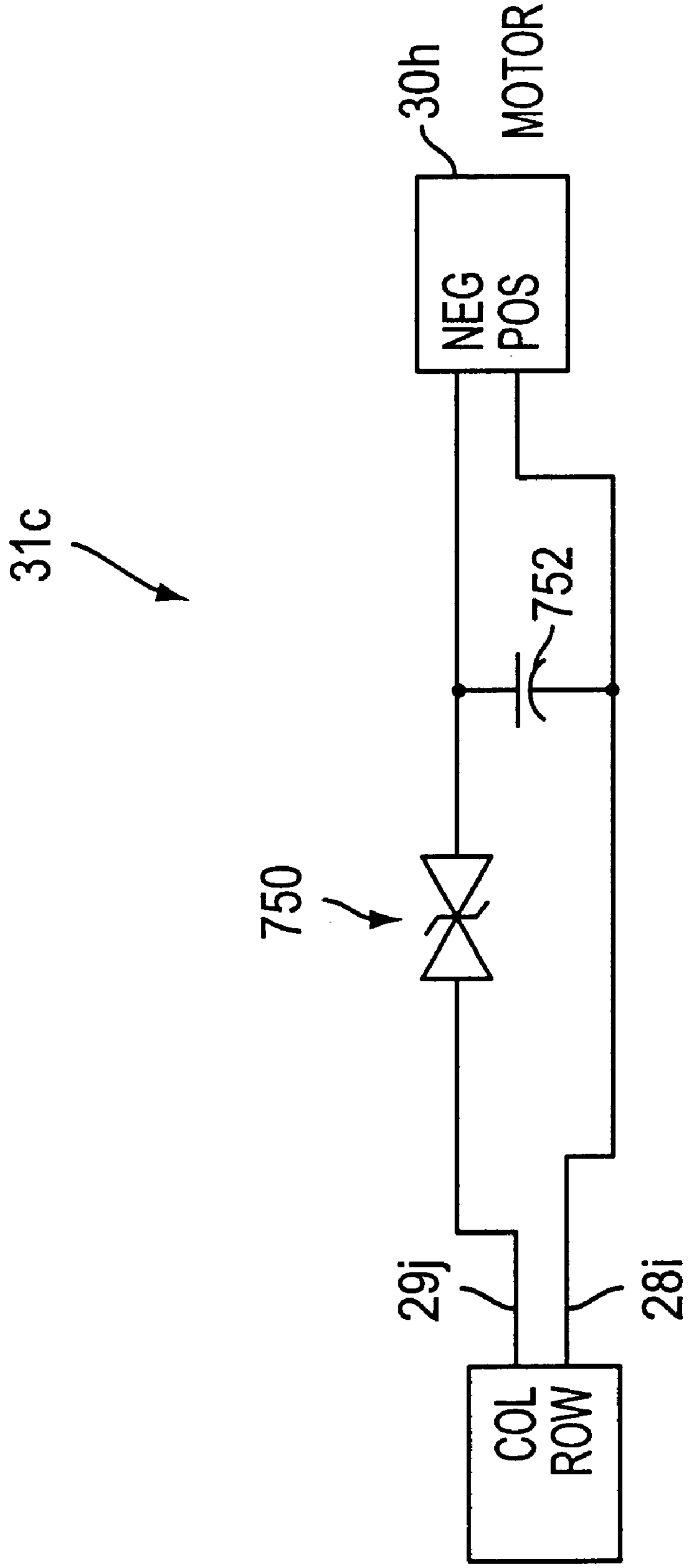

FIG. 7C illustrates another embodiment steering circuit 31*c* connecting a given motor 30*h* to a pair of row and column drive lines 28*i*, 29*j*. In the illustrated embodiment, each steering circuit 31*c* is identical, and accordingly, is coupled between a pair of row-column drive lines 28, 29 and a given motor 30 in the same way for each motor within motor matrix 29.

In this embodiment, a diac 750 is connected at one end to column drive line 29*j* and at the other end to the negative terminal of motor 30*h*. The row drive line 28*i* is connected directly to the positive terminal of motor 30*h*. A capacitor 752 is connected across the negative and positive terminals of motor 30*h*. Diac 750 may comprise a 4-layer breakover device such as a self-triggering triac, a sidac, or a Sidactor™.

This steering circuit 31*c* uses less parts and requires no PC board, and thus is less expensive. However, this steering circuit 31*c* has the disadvantage that once triggered, the diac continues to conduct. Accordingly, a noise pulse generated by one motor might trigger one or more other motors which will continue to turn while the selected motor is running. Circuitry may be added to prevent the occurrence of such noise.

Figure 8A:
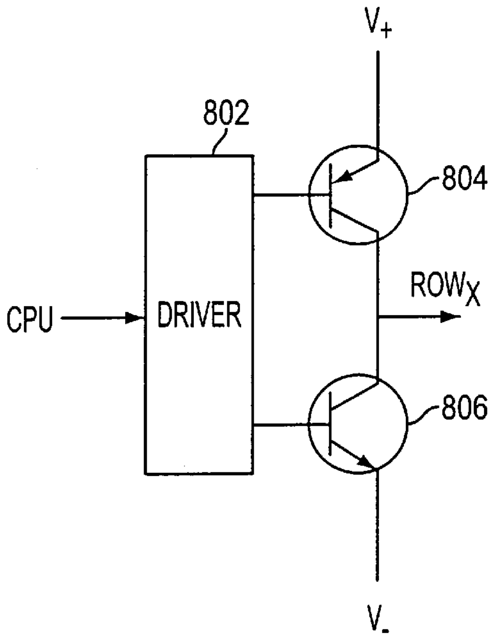
FIGS. 8A and 8B show schematic diagrams of bi-directional individual row and column selection circuits for use in the motor matrix illustrated in FIG. 6.
Figure 8B:
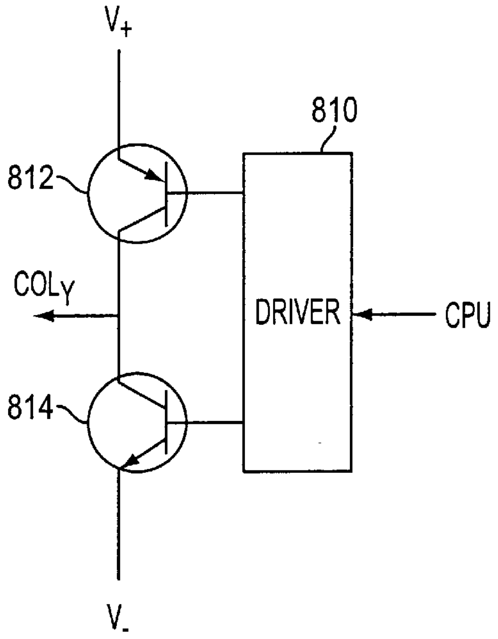
Figure 9A:
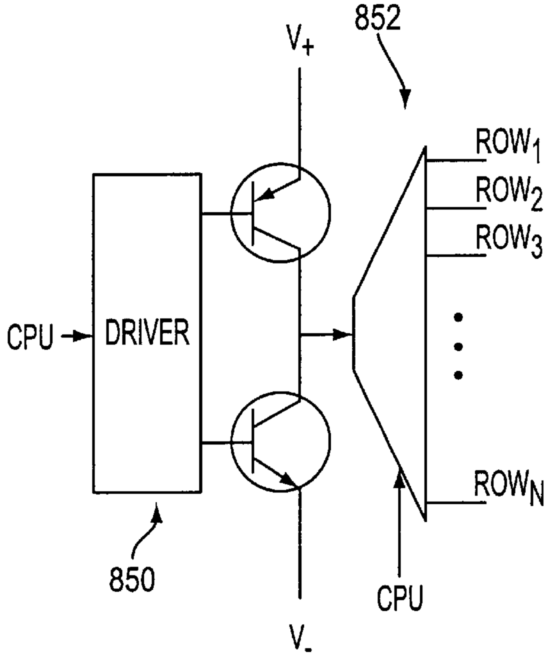
FIG. 9A and 9B show schematic diagrams of another type of bi-directional row and selection circuit
Figure 9B:
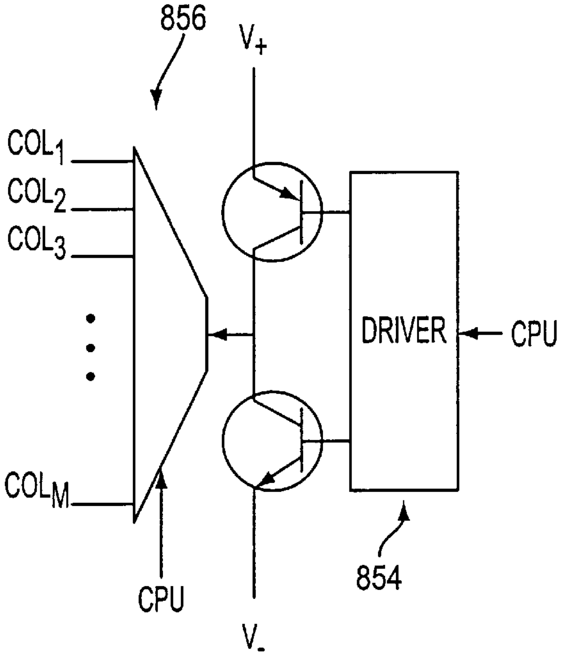

FIGS. 8A and 8B show a type of individual row and column selection circuits which can be used to control the voltage levels at the row and column drive lines. FIGS. 9A and 9B show alternative versions of row and column selection circuits which may be utilized as well.

FIG. 8A shows a bi-directional individual row selection circuit which comprises a driver 802, a pnp transistor 804, and an npn transistor 806. The emitter of pnp transistor 804 is connected to a positive voltage value V+, while its collector is connected to the collector of npn transistor 806. The emitter of npn transistor 806 is connected to a lower voltage level V−. The row selection circuit applies a voltage level to its corresponding row drive line $Row_x$, which is connected to the junction between the collector of transistor 804 and the collector of transistor 806. Driver 802 comprises respective outputs coupled to the base of each of transistors 804 and 806. A signal from CPU 14 is input to driver 802 to control the activation of the transistors 804 and 806 in order to control the voltage level at row drive line $Row_x$.

The individual selection circuit shown in FIG. 8B is identical to the selection circuit shown in FIG. 8A. It comprises a driver 810 having an input which receives a signal from CPU 14 and having outputs coupled to the respective bases of a pnp transistor 812 and an npn transistor 814. The collector of transistor 812 is connected to the collector of transistor 814, and is coupled to the corresponding column drive line $Col_y$. The emitter of transistor 812 is coupled to a positive voltage source V+, while the emitter of transistor 814 is coupled to a lower voltage source V−.

A separate individual bi-directional selection circuit is provided for each row and for each column in the motor matrix shown in FIG. 7A.

Alternatively, per the implementation shown in FIG. 9A and 9B, a single row selection circuit 850 may be provided together with a multiplexer 852 for all rows of the matrix, while a single column selection circuit 854 is provided together with a multiplexer 856 for all columns. In this embodiment, a signal is input to the control input of each multiplexer 852, 856 in order to control which row or column, respectively, the appropriate voltage level is applied to. The structure of the individual row and column selection circuits 850 and 854 shown in FIGS. 9A and 9B are identical to that of the selection circuits shown in FIGS. 8A and 8B, which are were described above.

While it is noted above that the helix may comprise a helical member, other types of mechanisms or structures may be utilized which, when driven, will forward a given article or product to a dispensed position. For example, a screw-shaped helix formed from molded plastic may be used in order to convey a powder material through a tube. Accordingly, a coffee machine which dispenses powder, such as sugar or powdered cream, can deliver the product by rotating the screw-shaped helix extending into a hopper containing the powder. The screw-shaped helix can be placed at an angle, for example, at 5 degree or a 10 degree slope. Once the desired amount of product is dispensed, the helix may be reversed, in accordance with the above-described process in order to prevent excess powder from dropping into the next drink.

A home sensing switch may be provided, as described above, which gives an indication of whenever the motor returns to a particular home position. A home position of the motor corresponds to a particular rotational position to which the motor returns after certain increments of rotation in a given direction. Home positions can be provided for the motor at increments more frequent than 360 degrees. For example, a home position may exist at every 180 degree rotational increment of the motor.

While the embodiment described herein utilizes a CPU 14, other controlling mechanisms may be provided, including e.g., wired hard logic, or even mechanical mechanisms. For example, micro switches (sensors) may be provided at locations that will notify the appropriate motor to reverse its direction. Relays may be provided which, when actuated by a given switch, reverse the current polarity on a DC motor causing the helix to change direction.

The helix may also be fabricated with welded metal. Rather than using a helix, a belt may be utilized. Just as described above with respect to the helix, once the article is fully dispensed by moving the belt in the dispensing direction, the belt may be reversed for a predetermined amount of distance in order to return the remaining product to an appropriate stored position.

Separate angle values for the positive dispensing direction and the reverse rotations, i.e., angles $a_1$ and $a_2$, may be programmed for different products within a given machine. This enables the optimization of the rotations for different types of products. With the use of sensors, the amount of rotation in the dispensing direction and in the reverse direction can be adjusted based upon real sensing information during the use of the vending machine. This can allow the gathering of data to adjust the amount of rotation in the dispensing direction and in the reverse direction in order to best dispense different types of products.

While the invention has been described by way of example embodiments, it is understood that the words which have been used herein are words of description, rather than words of limitation. Changes may be made, within the purview of the appended claims, without departing from the scope and spirit of the invention in its broader aspects. Although the invention has been described herein with reference to particular structures, materials, and embodiments, it is understood that the invention is not limited to the particulars disclosed. Rather, the invention extends to all proper equivalent structures, means, and uses.

What is claimed is:

1. An automated system for performing vend operations on articles selected by a purchaser, said system comprising:

a storage section arranged to store articles to be dispensed;

a vend section to which a purchased article is transferred from said storage section;

a vend-destined section adjacent said storage section and a vend mechanism associated with said vend-destined section to rapidly move a given article from said vend-destined section to said vend section;

a helical transfer member holding said articles in said storage section and being rotatable in a dispensing direction to transfer said given article from a position adjacent said vend-destined section to said vend-destined section, and being rotatable in a reverse direction opposite said dispensing direction;

a driver coupled to said helical transfer member and actuable to rotate said helical transfer member in either said dispensing direction or said reverse direction;

a controller operable during each vend operation to control said driver to first rotate said helical transfer member in said dispensing direction by a first amount until said given article is fully transferred to said vend-destined section and to then rotate said helical transfer member in said reverse direction by a second amount until an article immediately following said given article is securely held in said storage section.

2. The system according to claim 1, wherein said storage section comprises a support portion supporting said articles and an exiting end in communication with said vend-destined section.

3. The system according to claim 2, wherein said vend section comprises an article catching bin and a vend opening providing outside access to said catching bin.

4. The system according to claim 3, wherein said vend mechanism comprises a substantially vertical chute having an upper entrance and a lower exit leading to said vend section, and wherein said vend-destined section is located at said upper entrance.

5. The system according to claim 4, wherein said helical transfer member comprises a resilient rod formed as a helix.

6. The system according to claim 5, wherein said driver comprises an actuator and an electric motor.

7. The system according to claim 6, wherein said controller comprises a CPU.

8. The system according to claim 1, wherein said first amount is $360+a_1$ degrees and said second amount is $a_2$ degrees.

9. The system according to claim 8, wherein $a_1$ and $a_2$ are fixed values, and are equal to each other.

10. The system according to claim 8, further comprising a sensor for indicating a home position of said helical transfer member, $a_1$ being determined by said controller controlling said driver to rotate said helical transfer member in said dispensing direction for a predetermined amount of time, and $a_2$ being determined by said controller controlling said driver to continue the rotation of said helical transfer member in said reverse direction until said home position sensor indicates said helical transfer member is in said home position.

11. The system according to claim 8, further comprising a positive vend sensor positioned to generate a positive vend signal indicating a positive vend whereby said given article has been fully transferred to said vend-destined section.

12. The system according to claim 8, further comprising a positive vend sensor positioned to generate a positive vend signal indicating a positive vend whereby said given article has been fully transferred to said vend section.

13. The system according to claim 11, wherein, for each vend operation, $a_1$ is defined by said controller receiving said positive vend signal and stopping the rotation of said helical transfer member in said dispensing direction in response to said positive vend signal.

14. The system according to claim 12, wherein, for each vend operation, $a_1$ is defined by said controller receiving said positive vend signal and stopping the rotation of said helical transfer member in said dispensing direction in response to said positive vend signal.

15. The system according to claim 13, wherein, for each vend operation, $a_2$ is set equal to $a_1$.

16. The system according to claim 14, wherein, for each vend operation, $a_2$ is set equal to $a_1$.

17. The system according to claim 11, further comprising a store check sensor positioned to generate a positive store signal indicating a secure storage state wherein the article immediately following said given article is securely held in said storage section.

18. The system according to claim 17, wherein, for each vend operation, $a_2$ is defined by said controller receiving said positive storage signal and stopping the rotation of said helical transfer member in said reverse direction in response to said positive store signal.

19. The system according to claim 7, wherein said storage section comprises multiple storage subsections, and said system further comprises:

a corresponding helical transfer member and a corresponding driver for each said storage subsection, each said corresponding helical transfer member holding additional said articles in a corresponding one of said storage subsections and being rotatable in a dispensing direction to transfer a corresponding given article from a position in said corresponding storage subsection adjacent said vend-destined section to said vend-destined section;

each said corresponding driver being coupled to said corresponding helical transfer member and being actuable to rotate said corresponding helical transfer member in either said dispensing direction or said reverse direction.

20. The system according to claim 19, wherein each said corresponding driver comprises an electric motor and a steering circuit, said system further comprising a matrix of row and column drive lines coupled to said electric motors and steering circuits, and a selection mechanism for applying predetermined signals to a given row-column pair of said row and column drive lines to actuate a given electric motor, each said steering circuit comprising a selectively bi-directional steering mechanism allowing current to flow through an associated electric motor of said steering circuit in only a first direction when a first set of predetermined signals is applied to an associated row-column pair of said row and column drive lines and allowing current to flow through the associated electric motor in only a second direction, opposite said first direction, when a second set of predetermined signals is applied to the associated row-column pair of said row and column drive lines.

21. The method according to claim 20, wherein said predetermined signals comprise predetermined voltage levels.

22. A method for performing vend operations on articles selected by a purchaser, said method comprising:

storing articles to be dispensed in a storage section;

transferring a purchased article from said storage section to a vend section;

using a vend mechanism to rapidly move a given article from a vend-destined section adjacent said storage section to said vend section;

holding said articles in said storage section with a helical transfer member, said helical transfer member being rotatable in a dispensing direction to transfer said given article from a position immediately adjacent said vend-destined section to said vend-destined section, and being rotatable in a reverse direction opposite said dispensing direction;

during each vend operation, actuating the rotation of said helical transfer member in said dispensing direction by a first amount until said given article is fully transferred to said vend-destined section, and actuating the rotation of said helical transfer member in said reverse direction by a second amount until an article immediately following said given article is securely held in said storage section.

23. The method according to claim 22, wherein said storing of said articles to be dispensed comprises storing said article on a support portion supporting said articles, said support portion comprising an exiting end in communication with said vend-destined section.

24. The method according to claim 23, wherein said purchased article is moved to said vend section comprising an article catching bin, said method further comprising providing outside access to said catching bin.

25. The method according to claim 24, wherein said actuating of the rotation of said helical transfer member comprises the use of a central processing unit (CPU).

26. The method according to claim 22, wherein said first amount is $360+a_1$ degrees, and said second amount is $a_2$ degrees.

27. The method according to claim 26, wherein $a_1$ and $a_2$ are fixed values and are equal to each other.

28. The method according to claim 26, further comprising indicating with a sensor a home position of said helical transfer member, $a_1$ being determined by actuating the rotation of said helical transfer member in said dispensing direction for a predetermined amount of time, and $a_2$ being determined by continuing the activation of the rotation of said helical transfer member in said reverse direction until said sensor indicates said helical transfer member is in said home position.

29. The method according to claim 26, further comprising generating a positive vend signal indicative of a positive vend whereby said given article is fully transferred to said vend-destined section.

30. The method according to claim 26, further comprising generating a positive vend signal indicating a positive vend whereby said article is fully transferred to said vend section.

31. The method according to claim 29, wherein, for each vend operation, $a_1$ is defined by stopping the rotation of said helical transfer member in said dispensing direction in response to said positive vend signal.

32. The method according to claim 30, wherein, for each vend operation, $a_1$ is defined by stopping the rotation of said helical transfer member in said dispensing direction in response to said positive vend signal.

33. The method according to claim 31, wherein, for each vend operation, $a_2$ is set equal to $a_1$.

34. The method according to claim 32, wherein, for each vend operation, $a_2$ is set equal to $a_1$.

35. The method according to claim 29, further comprising generating a positive store signal indicating a secure stored state wherein the article immediately following said given article is securely held in said storage section.

36. The method according to claim 35, wherein, for each vend operation, $a_2$ is defined by stopping the rotation of said helical transfer member in said reverse direction in response to said positive store signal.

* * * * *